Dec. 1, 1936.        E. H. McCLOUD        2,062,593
OPERATOR FOR ROLL TOP DOORS
Filed May 25, 1932

INVENTOR
EDWARD H. McCLOUD,
BY
Toulmin & Toulmin
ATTORNEYS

Patented Dec. 1, 1936

2,062,593

UNITED STATES PATENT OFFICE 2,062,593

OPERATOR FOR ROLL TOP DOORS

Edward H. McCloud, Columbus, Ohio, assignor to The Kinnear Mfg. Company, Columbus, Ohio, a corporation of Ohio Application May 25, 1932, Serial No. 613,429

2 Claims. (Cl. 64—29)

This invention relates to improvements in operating mechanism for roll top doors.

It is an object of this invention to provide, for use especially in connection with a roll top door, with motor-operated means for opening and closing the door, a slip connection between the motor and the door so that if the door should be jammed the operative connection between the door and the motor will not break.

It is my object to provide a slipping element in the driving mechanism which functions if undue resistance is encountered by the door when in motion, such as coming down on top of an automobile. The travel of the door is controlled by a limit switch, and the several parts are so arranged according to my invention, that in the event of slippage in the driving mechanism the timing of the door travel will not be interfered with because the timing mechanism is located between the door and the slipping element.

These and other advantages will appear from the following description taken in connection with the drawing.

Referring to the drawing.

Figure 1:
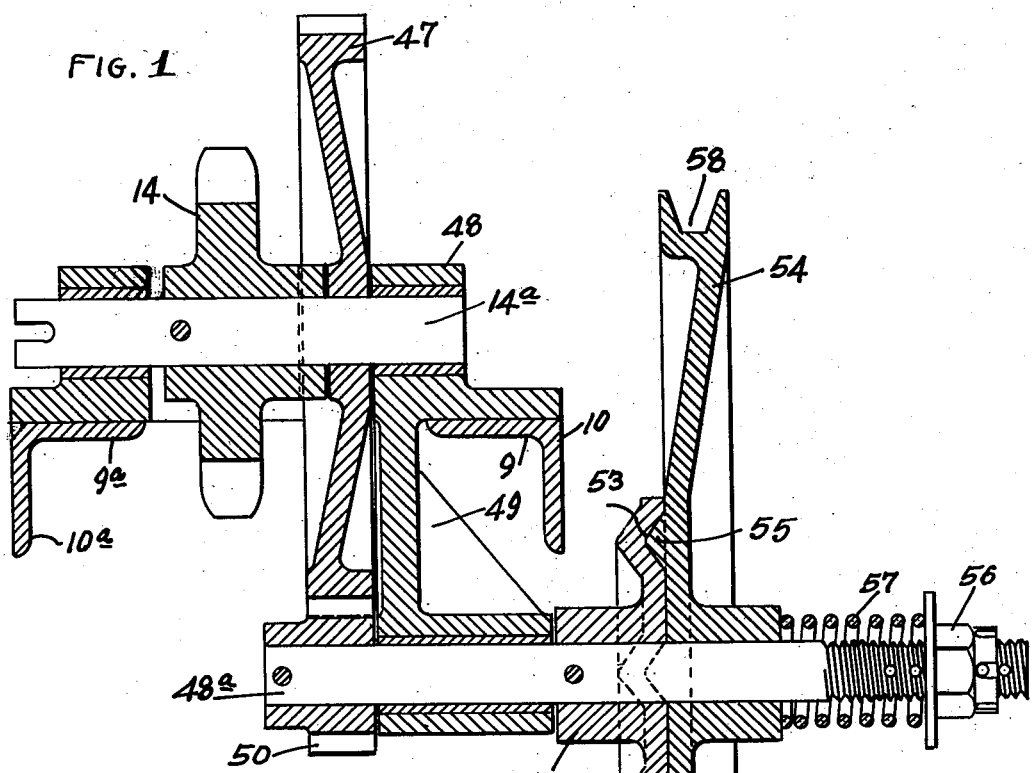
Figure 1 is an elevational view in section of structure according to my invention.
Figure 2:
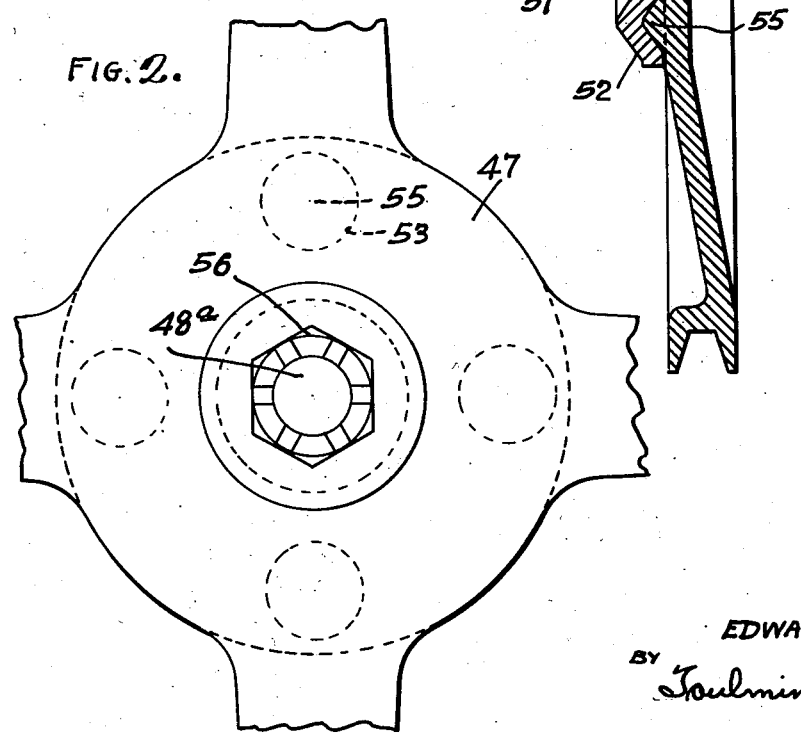
Figure 2 is an enlarged elevational view of the hub part of the slip pulley illustrated in Figure 1 with the pulley partly broken away.

The sprocket wheel 14 located on the shaft 14a is supported in suitable bearings 48 on the trackway 9, 9a, 10, 10a. Adjacent this sprocket wheel is a large gear 47, through which the sprocket wheel is caused to rotate. This gear meshes with a pinion 50 located on a shaft 48a, supported by means of a bracket 49 which extends downwardly from one of the bearings 48. This bearing 48 and bracket 49 are supported by means of one of the track members, and in the present instance, as shown in Figure 1, they are supported on the horizontal part 9 of one of the track members.

Adjacent the bracket 49 and rigidly attached to the shaft 48a for rotation therewith is a sleeve 51, which has a disc 52, thereon, remote from the bracket 49. In the outer face of this disc is a plurality of cone-shaped recesses or depressions 53, adapted to receive similar projections 55 located on the adjacent face of a pulley 54 located upon the shaft 48a adjacent the disc, and adapted to rotate with the disc or independent of the disc.

For holding the disc and the pulley in engagement with the projections seated in the depression there is provided on the end of the shaft a nut 56, which has between it and the hub of the pulley a spring 57. By means of this nut the compression of the spring may be adjusted. This spring tends to hold the cone-shaped projections seated in the cone-shaped depressions, as shown in Figure 1, but if the door or any of the parts associated therewith should become jammed the pulley 54 may rotate independent of the disc. In this event the projections 55 would slide out of the depressions, due to the yielding of the spring.

Around the pulley 54 is a groove 58, in which a belt seats and operates. This belt passes around a pulley on the shaft of a suitable prime mover supported in some suitable manner by the members forming the trackway.

It will be understood that it is desired to comprehend within this invention such modifications as come within the scope of the claims and the invention.

Having thus fully described my invention, what I claim as new and desire to secure by Letters Patent, is:

1. A slip connection for power-transmitting mechanism comprising a shaft, a disc fixed to the shaft, said disc having conical depressions therein, a pulley loosely mounted on the shaft, said pulley having correspondingly disposed conical projections adapted to slip into and out of said depressions, and a coil spring on the shaft arranged to urge said pulley against said disc with the projections in the depressions.

2. A slip connection for power-transmitting mechanism comprising a shaft, a disc fixed to the shaft, said disc having conical depressions therein, a pulley loosely mounted on the shaft, said pulley having correspondingly disposed conical projections adapted to slip into and out of said depressions, a coil spring on the shaft arranged to urge said pulley against said disc with the projections in the depressions, and means for adjusting the pressure exerted by said coil spring.

EDWARD H. McCLOUD.